US009995373B2

(12) United States Patent
Plett

(10) Patent No.: US 9,995,373 B2
(45) Date of Patent: Jun. 12, 2018

(54) MANUAL DRIVE FOR A MOTOR COMPRISING A ROTATIONAL MEMBER MOVABLE AXIALLY ALONG A SHAFT OF THE DRIVE

(71) Applicant: Vidir Machine Inc., Arborg (CA)

(72) Inventor: Delmer Plett, Arborg (CA)

(73) Assignee: Vidir Solutions Inc., Arborg (CA)

( * ) Notice: Subject to any disclaimer, the term of this patent is extended or adjusted under 35 U.S.C. 154(b) by 295 days.

(21) Appl. No.: 15/078,120

(22) Filed: Mar. 23, 2016

(65) Prior Publication Data

US 2017/0275098 A1 Sep. 28, 2017

(51) Int. Cl.
*G05G 25/00* (2006.01)
*F16H 7/02* (2006.01)
*B65G 1/127* (2006.01)

(52) U.S. Cl.
CPC .............. *F16H 7/02* (2013.01); *B65G 1/127* (2013.01)

(58) Field of Classification Search
CPC ...... F16H 2025/2065; F16H 2025/2071; E05F 15/692; F16D 67/02
USPC ......................................................... 74/625
See application file for complete search history.

(56) References Cited

U.S. PATENT DOCUMENTS

| 4,438,662 A * | 3/1984 | Walton | G05B 19/40 137/85 |
| 4,527,445 A * | 7/1985 | Walton | G05D 16/2086 251/129.03 |
| 6,769,527 B1 * | 8/2004 | Paris | F16D 67/02 192/16 |
| 9,431,868 B2 * | 8/2016 | Rosengren | H02K 7/00 |

* cited by examiner

*Primary Examiner* — Jake Cook
(74) *Attorney, Agent, or Firm* — Adrian D. Baltison; Ade & Company Inc.; Ryan W. Dupuis

(57) ABSTRACT

A manual drive for a motor with an external rotational member coupled to a main shaft of the motor features a transmission rotational member which is movable axially along a shaft about which it rotates, such that the transmission rotational member of the manual drive is movable between a driving position at one location along the shaft where the transmission rotational member is rotatable so as to drive the motor and a braking position at a different location along the shaft where the transmission rotational member is in engagement with a braking member for braking the motor. The shaft features a threaded portion which is arranged to draw the transmission rotational member rotating in the first rotational direction along the shaft towards a first portion of the braking member by threadable engagement with the transmission rotational member for braking the transmission rotational member rotating in the first rotational direction.

18 Claims, 4 Drawing Sheets

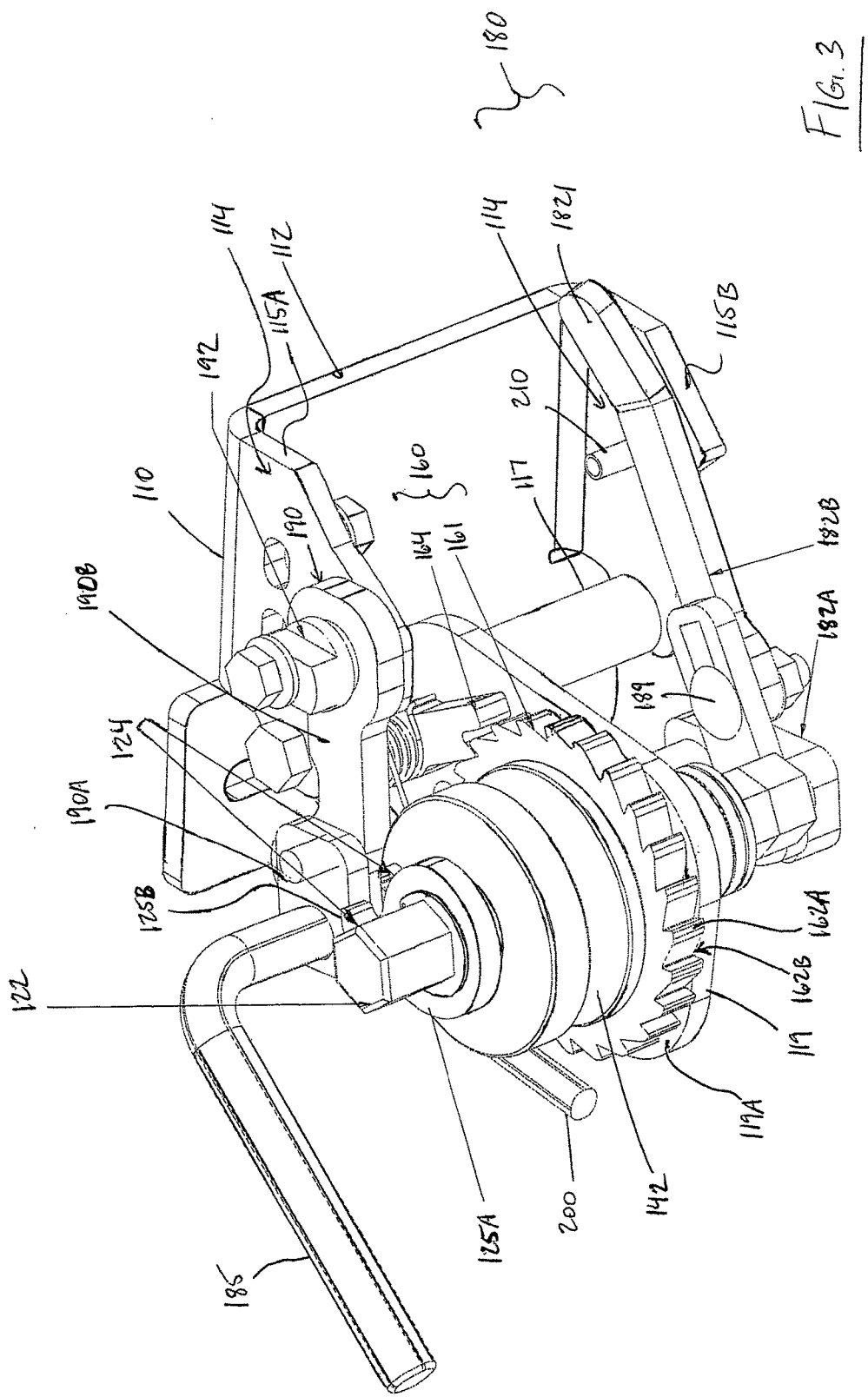

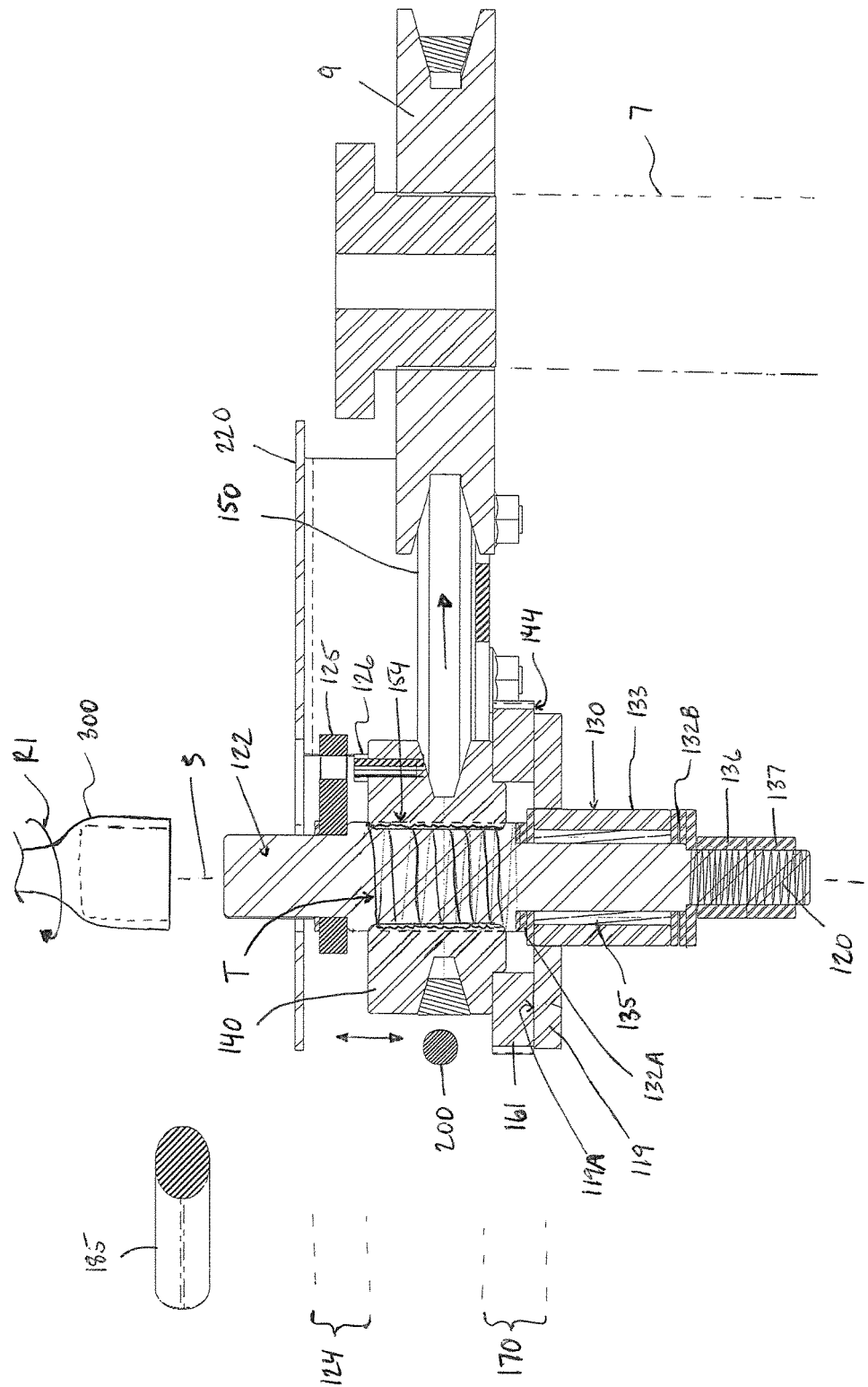

US 9,995,373 B2

MANUAL DRIVE FOR A MOTOR COMPRISING A ROTATIONAL MEMBER MOVABLE AXIALLY ALONG A SHAFT OF THE DRIVE

The present invention relates to a manual drive for a motor that is particularly but not exclusively suited for driving the motor when conventional input to the motor is unavailable, for example a power outage condition when the motor is an electric motor drawing its input from a power grid. Such manual drives are arranged to drive the motor so as to operate a load attached to the motor. The manual drive is typically also arranged to provide braking functions so as to brake the load.

SUMMARY OF THE INVENTION

According to one aspect of the invention there is provided a manual drive for a motor with an external rotational member coupled to a main shaft of the motor, the manual drive comprising:

a body;

a mounting arrangement defined by the body for mounting adjacent the motor in proximity to the external rotational member thereof;

a shaft supported by the body for rotational movement;

a transmission rotational member carried on the shaft for rotational movement about an axis defined by the shaft such that the transmission rotational member is arranged for operatively coupling to the external rotational member of the motor where the rotational movement of the transmission rotational member is operable to drive the motor via its external rotational member;

a driving member carried on the shaft at a location adjacent the transmission rotational member so as to be arranged for effecting the rotational movement of the transmission rotational member in a first rotational direction by rotational movement of the driving member in the first rotational direction;

a braking member arranged for braking rotational movement of the transmission rotational member;

the transmission rotational member being movable axially along the shaft between a driving position at one location along the shaft where the transmission rotational member is rotatable in cooperation with the driving member so as to drive the motor and a braking position at a different location along the shaft where the transmission rotational member is in engagement with the braking member for braking the motor.

In one arrangement the driving member and the braking member are disposed on opposite sides of the transmission rotational member such that the transmission rotational member is movable axially along the shaft therebetween.

In one arrangement the driving member comprises a first projecting element protruding radially of the shaft that is operable to engage a cooperative second projecting element on the transmission rotational member that is located at a radially spaced position of the shaft.

In one arrangement the braking member comprises a surface carried by the body that is arranged to engage a face of the transmission rotational member facing axially in a direction along the shaft.

In one arrangement the shaft is threaded and the transmission rotational member has a bore receiving the shaft that has an inner surface which is threaded for threadably engaging the threaded shaft.

Another important independent optional feature is that the shaft is threaded in a manner so as to be arranged to draw the transmission rotational member rotating in the first rotational direction along the shaft towards the braking member.

The threading of the shaft thus acts to bias the transmission rotational member towards the braking member.

Another important independent optional feature is that the transmission rotational member in its rotational movement is rotatable relative to the shaft such that the transmission rotational member and the shaft are rotatable in the first rotational direction at the same or different speeds.

Therefore, for example in an over-speed condition where the transmission rotational member is rotating more quickly than the shaft, the shaft threading acts to bring the transmission rotational member towards the braking member so as to slow down the transmission rotational member.

In one arrangement the transmission rotational member includes a ratchet arranged to resist rotational movement of the transmission rotational member in an opposite second rotational direction.

In this manner, there is braking provided in both the first and second rotational directions to provide better speed control and braking abilities for the manual drive.

In one arrangement the transmission rotational member forms a pulley.

However, the transmission rotational member may also form for example a cog with teeth.

Another important independent optional feature is that a free end of the shaft is shaped for cooperation with a socket of a hand drill.

Hand power drills may be battery-operated and thus cordless so as to be suited for operation in a power outage condition. Also, hand power drills may provide sufficient power including speed and torque for driving the manual drive.

As such, in the manual drive the shaft is operated by an external agent, for example a human user, in order to drive the manual drive which in turn drives the motor.

Another important independent optional feature is that there is provided a motor brake release mechanism that is arranged to disable a brake of the motor such that the motor is controllable by the manual drive.

For example, where the motor is an electric motor, the brake of the motor may be automatically activated when conventional input to the motor is not being provided. Thus, in order to override the motor so as to operate the manual drive and thereby drive the load through the motor, the motor brake release mechanism cooperates to disable the brake of the motor whose braking functions are then taken over by the manual drive.

In one arrangement the motor brake release mechanism comprises an arm with an inclined end which is operable to engage the brake of the motor in a manner whereby the brake is disabled.

For example, the arm forms a plate where the inclined end is inclined out of a plane of a main portion of the arm.

According to another aspect of the invention there is provided a manual drive for a motor with an external rotational member coupled to a main shaft of the motor, the manual drive comprising:

a body;

a mounting arrangement defined by the body for mounting adjacent the motor in proximity to the external rotational member thereof;

a shaft supported by the body for rotational movement;

a transmission rotational member carried on the shaft for rotational movement about an axis defined by the shaft such that the transmission rotational member is arranged for operatively coupling to the external rotational member of the motor where the rotational movement of the transmission rotational member is operable to drive the motor via its external rotational member;

a driving member carried on the shaft at a location adjacent the transmission rotational member so as to be arranged for effecting the rotational movement of the transmission rotational member in a first rotational direction by rotational movement of the driving member in the first rotational direction;

a braking member arranged for braking rotational movement of the transmission rotational member;

the transmission rotational member having a bore receiving the shaft that has an inner surface which is at least partly threaded;

the shaft having a threaded portion along at least a portion of its axial length that is threaded in a manner so as to be arranged to draw the transmission rotational member rotating in the first rotational direction along the shaft towards a first portion of the braking member by threadable engagement with the transmission rotational member such that the first portion of the braking member is operable for braking the transmission rotational member rotating in the first rotational direction;

and a second portion of the braking member arranged for braking the transmission rotational member rotating in an opposite second rotational direction.

In one arrangement the first portion of the braking member comprises a surface carried by the body oriented in a radial plane of the shaft so as to be arranged to engage a face of the transmission rotational member facing axially along the shaft.

Another important independent optional feature is that the surface is arranged at a fixed location such that the transmission rotational member is movable axially along the shaft towards the fixed surface.

In one arrangement the second portion of the braking member forms a ratchet arranged to resist rotational movement of the transmission rotational member in the second rotational direction.

Another important independent optional feature is that a part of the ratchet is unitary with the transmission rotational member so as to be rotatable therewith.

In one arrangement the part of the ratchet unitary with the transmission rotational member includes a face facing axially along the shaft that is arranged to engage the first portion of the braking member when braking in the first rotational direction.

BRIEF DESCRIPTION OF THE DRAWINGS

One arrangement of the invention will now be described in conjunction with the accompanying drawings in which:

FIG. 3 is another isometric view of the manual drive of FIG. 1 where some components are omitted for clarity of illustration.

FIG. 4 is a cross-sectional view along line 4-4 in FIG. 2 where some components are omitted for clarity of illustration.

In the drawings like characters of reference indicate corresponding parts in the different figures.

DETAILED DESCRIPTION

Figure 1:
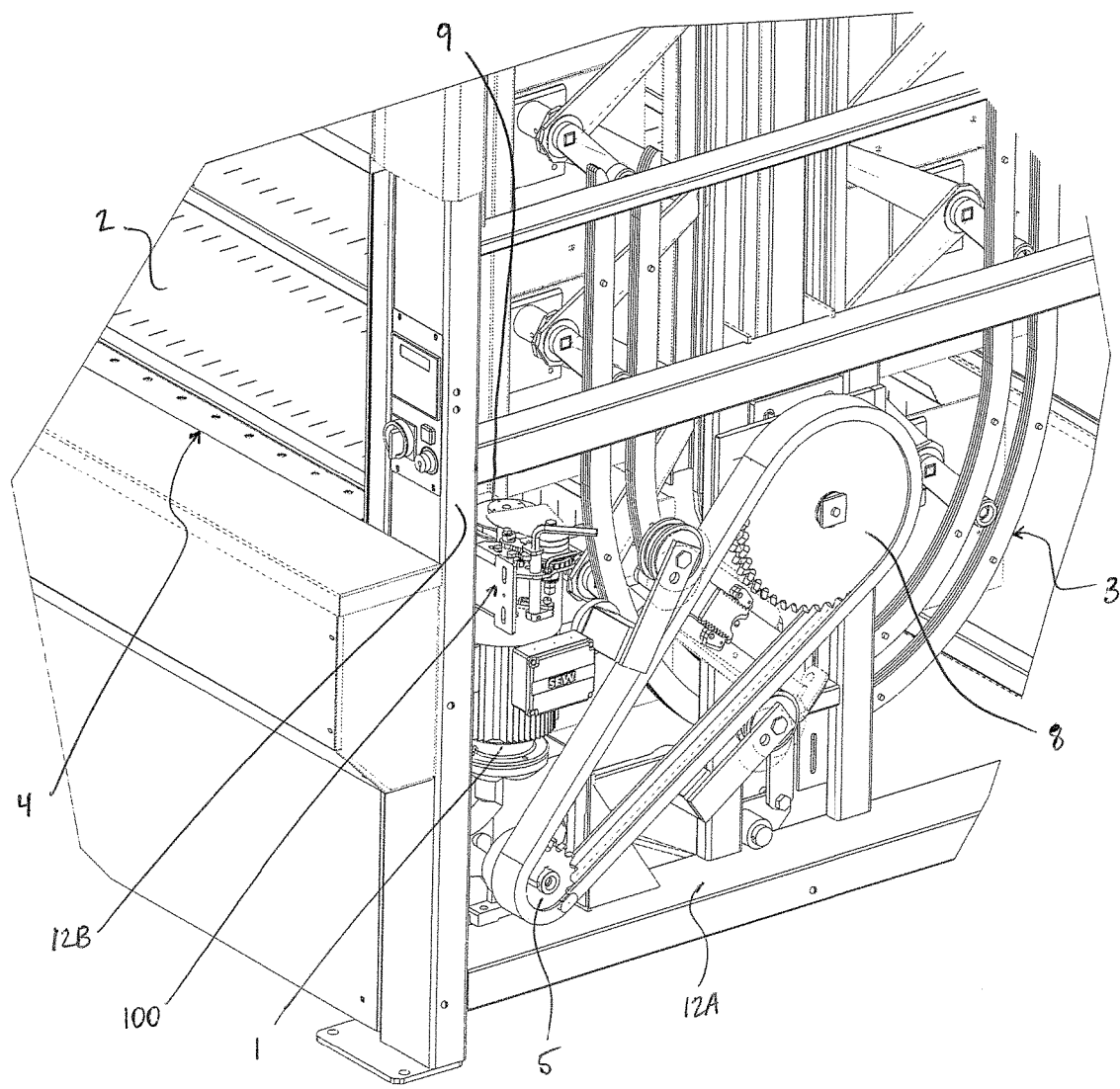
FIG. 1 is an isometric view of manual drive according to the present invention that is coupled to a motor of a machine.
Figure 2:
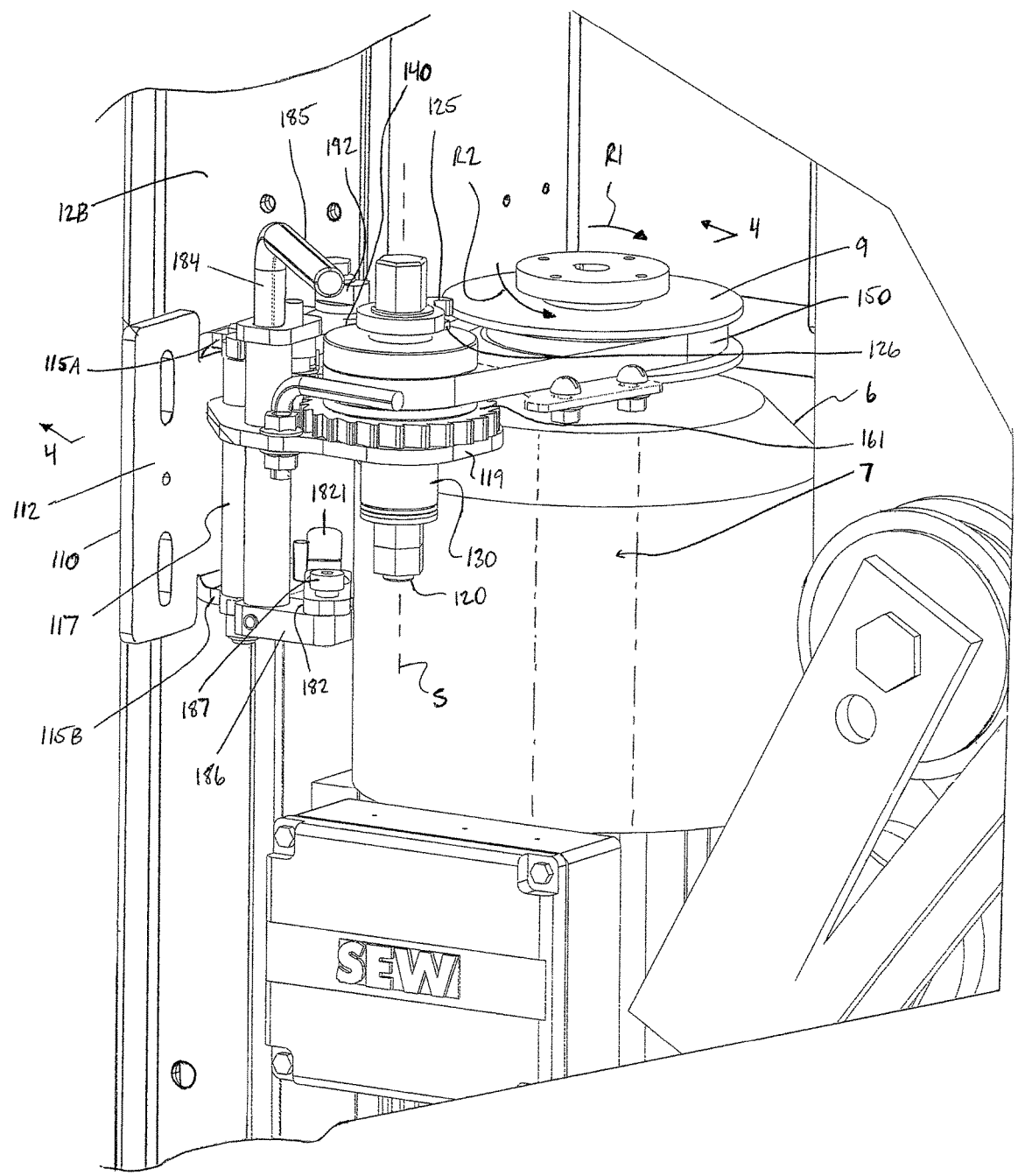
FIG. 2 is an enlarged isometric view from a similar perspective as that in FIG. 1 but showing the manual drive of FIG. 1 up close. Some components are omitted in this figure for clarity of illustration.

The accompanying figures show a manual drive 100 which is particularly but not exclusively designed for use with a motor 1 of a pan carousel machine manufactured and sold by the Applicant under the tradename Vidir Pan Carousel. The pan carousel machine provides a storage system with pans or carriers 2 carried in vertically stacked configurations on a conveyor 3 forming a closed loop in a generally vertical plane to deliver at a front access opening 4 of the machine that pan which is recalled to the access opening by a user.

Typically, the pan carousel machine is driven by a three phase electric motor which draws power from a local power grid. As such, during a power outage of the power grid, the pan carousel machine may not be operable thus impeding the user from accessing items which are stored in the pan carousel machine but not located in the respective pan which is already at the access opening.

Furthermore, the motor 1 includes a brake which is activated in a working position of the brake when the motor is not driving its load, for example when the motor is in an off state so as to not be drawing power from the grid.

In the example in this specification, the load of the motor 1 is the conveyor 3 carrying the pans. There are provided gears 5 external to a casing 6 of the motor so as to transfer power from a main shaft 7 of motor, which is generally vertically oriented, through the gears 5 to the conveyor 3 which defines the load of the motor in this example. The conveyor has an initial drive gear 8 which is directly operatively coupled to the external motor gears 5.

The motor also includes an external rotational member 9 on an outside of the motor casing 6 which is coupled to the main shaft 7 (schematically shown) such that the main shaft can be driven by an external auxiliary input, for example in the event of a power outage. In the illustrated arrangement, the external rotational member 9 forms a pulley which is oriented in a radial plane of the motor's main shaft 7. As the motor of the illustrated arrangement may be operate in both a forward direction (that is, a conventional reference direction) and a reverse direction, the external rotational member is rotatable in both a first rotational direction R1 corresponding to the forward direction and an opposite second rotational direction R2 corresponding to the reverse direction. It thus will be appreciated that the conveyor 3 of the pan carousel machine may operate in two opposite directions such that the pan 2 selected by the user may traverse a shortest path from its present location to the access opening 4, which may not always result in movement of the conveyor in the same direction for all such cases.

It will also be appreciated that the pans may not all be equally loaded (with items which are overall stored in the pan carousel machine) thereby resulting in an unbalanced condition of the conveyor where the loading of the conveyor on the motor may induce undesirable rotation of the motor's main shaft. As such, the brake of the motor may be activated when the main shaft is stationary so as to hold the main shaft against loading of the conveyor on same.

Turning now to the manual drive 100 in more detail, the manual drive comprises a body 110 on which other components of the drive are carried or supported.

The body includes a mounting portion 112 which defines a mounting arrangement of the drive for mounting adjacent the motor in proximity to the external rotational member thereof. The mounting portion thus forms a bracket with openings therein for accepting fasteners (not shown) so that the drive 100 is mountable to a frame 12 of the pan carousel machine. In the illustrated arrangement, the motor 1 is situated within a periphery of the frame 12 with the external motor gears 5 disposed over a bottom cross-member 12A of the frame. The drive 100 is secured by its mounting arrangement to an upright frame member 12B at a height generally horizontally inline with the external rotational member 9 of the motor. The drive is thus arranged at a top of the motor casing 6, and a portion 113A of the bracket locating the openings therein is oriented upright at the upright frame member 12B typically.

A support portion 114 of the body extends from the mounting portion 112 in a transverse direction thereto. The support portion 114 includes a top support plate 115A and a bottom support plate 115B extending from the portion 113A in generally parallel condition to one another. The top and bottom plates 115A, 115B are interconnected by an elongated connecting member 117. For example, as in the illustrated arrangement the connecting may be a hollow tube which is rigidly attached at its opposite ends to the top and bottom support plates by threaded fasteners passing through openings in the top and bottom support plates 115A, 115B and into the connecting member 117.

There is provided an intermediate support plate 119 at a location between the top and bottom support plates 115A, 115B but closer to the top support plate than the bottom plate. The intermediate support plate 119 is affixed to the connecting member so as to be held in fixed position therealong and extends radially of the connecting member 117 in a direction away from the bracket of the mounting arrangement.

The intermediate support plate 119 includes an opening at a location further from mounting portion 112 than the connecting member 117 through which a shaft 120 passes in generally upright orientation. The shaft 120 is supported by the body for rotational movement of the shaft. At the opening in the intermediate support plate there is provided a cylindrical shaft housing 130 depending from the support plate 119. The shaft housing 130 circumferentially encloses a portion of the shaft 120 below the intermediate support plate and therefore extends axially along the shaft. The shaft housing comprises annular top and bottom end caps 132A and 132B to close the housing at its top and bottom ends, and a tubular outer enclosure 133 spanning between the end caps. The annular end caps are for example bronze washers. Inside the housing, a bushing 135 is provided coaxially of the shaft 120 so as to circumferentially surround the shaft. The bushing 135 generates drag on the rotating shaft such that the bushing acts to brake rotation of the shaft, as compared to for example a ball bearing which generates virtually no drag. It is the bushing 135 which acts to hold the shaft 120 in generally fixed position along its axis S relative to the intermediate support plate 119. Additional fasteners of the type such as nuts 136, 137 may be threadably received on a free end of the shaft 120 that protrudes beyond the housing 130 below the intermediate support plate. Adjustment of the nuts 136, 137 determines end play of the shaft 120, for example in directions radially of the shaft. Furthermore, load on the shaft acting transversely thereof is supported by the bushing 135. The bushing is for example made of bronze.

Further to the shaft 120, the drive 100 includes a transmission rotational member 140 which is carried on the shaft for rotational movement about an axis S defined by the shaft. The transmission rotational member, which in the illustrated arrangement forms a pulley with a generally smooth circumferential groove 142 thereabout, is operatively coupled by an endless belt 150 to the external rotational member 9 of the motor, such that rotational movement of the transmission rotational member of the drive 100 is operable to drive the motor 1 via its external rotational member.

A free end of the shaft 120 forms a drive head 122 arranged for operatively coupling to a drive input, for example a hand of a human agent or a battery-powered power tool, such that the shaft may be driven in its rotational movement thereby, and this rotational movement then be transferred to drive the transmission rotational member 140. In the illustrated arrangement, the drive head is shaped for cooperation with a socket of a hand drill 300. Thus, for example, the drive head may be a hex head and the manual drive 100 may be suitably driven by a ½" 18V cordless drill with a 2 speed function.

A driving member 124 is provided so as to be carried on the shaft alongside the drive head 122 at a location spaced above the intermediate support plate 119. The driving member is thus located adjacent the transmission rotational member so as to be arranged for effecting rotational movement thereof by rotational movement of the driving member. The driving member is particularly designed for effecting the rotational movement of the transmission rotational member in the first rotational direction by rotational movement of the driving member in this same direction.

In the illustrated arrangement, the driving member comprises a first projecting element 125 carried by the shaft in fixed relation thereto such that the first projecting element is rotatable with the shaft. The first projecting element 125 protrudes radially of the shaft 120 so as to be operable to engage a cooperative second projecting element 126 which is supported at a radially spaced position of the shaft on a face of the transmission rotational member facing axially towards the drive head. The second projecting element 126 is supported in fixed relation to the transmission rotational member 140 so as to be rotatable therewith, like the first projecting element with respect to the shaft.

The first projecting element forms a partial spiral 125A wrapping in the first rotational direction about the shaft with a free end 125B of the spiral presented with a face facing in the first rotational direction. Thus, it is the free end 125B of the first projecting element that is arranged to engage the second projecting element 126 on the transmission rotational member.

It will be appreciated that the second projecting element may be unitary with the transmission rotational member so that they form a single body, or the second projecting element may be a separate component which is mounted on the transmission rotational member.

At an oppositely axially facing end of the transmission rotational member there is included a ratchet cog 161 which is arranged to cooperate with a spring-loaded pawl 164 such that rotational movement of the transmission rotational member in the second rotational direction is resisted and thereby limited to the first rotational direction. Teeth 162A of the cog are thus oriented to project in the second rotational direction such that by engagement of the pawl in indentations 162B of the cog the transmission rotational member is prevented from rotating in the second rotational direction. Furthermore, the ratchet cog 161 and pawl 164 are located between the belt-receiving portion of the transmission rotational member, i.e., the groove 142 in the illustrated arrangement, and the intermediate support plate 119 at a location clear of the path of the drive belt 150.

Thus, a ratchet 160 of the manual drive 100 that is collectively formed by the cog 161 and pawl 164 forms a portion of a braking member 170 of the manual drive arranged for braking rotational movement of the transmission rotational member.

Another portion of the braking member 170 is formed by a surface 119A of the intermediate support plate facing axially towards the transmission rotational member 140 that is thus arranged to engage an immediately adjacent face of the transmission rotational member.

In order to render the intermediate support plate's surface 119A operable for braking rotational movement the transmission rotational member particularly in the first rotational direction, the shaft 120 is at least partly threaded T along a portion thereof which is above the intermediate support plate 119 and a bore 154 of the transmission rotational member receiving the shaft 120 therethrough, that is a central cylindrical hollow of the transmission rotational member, is also threaded so as to threadably engage the shaft in a cooperative manner. As such, the threading provides control of position of the transmission rotational member axially along the shaft by relative movement of the transmission rotational member with respect to the shaft.

More specifically, the shaft is threaded in a manner so as to be arranged to draw the transmission rotational member rotating in the first rotational direction downwardly along the shaft towards the intermediate support plate. The threading of the shaft thus acts to bias the transmission rotational member towards the braking surface 119A when there is relative movement of the transmission rotational member with respect to the shaft in the first rotational direction. Furthermore, it thus will be appreciated that the transmission rotational member and the shaft are rotatable relative to one another such that they are rotatable in a common rotational direction at the same or different speeds.

As such, by contact of the transmission rotational member 140 with the braking surface 119A of the intermediate support plate rotational movement of the transmission rotational member in the first rotational direction R1 may be slowed down. Furthermore, in order for the transmission rotational member to be free to rotate in the first rotational direction for driving the external rotational member the transmission rotational member thus is required to be arranged in spaced relation with respect to the braking surface 119A.

The transmission rotational member 140 is therefore movable axially along the shaft 120 between a driving position at one location along the shaft where the transmission rotational member is rotatable in cooperation with the driving member 124 so as to drive the motor 1 and a braking position at a different location along the shaft where the transmission rotational member is in engagement with the braking surface 119A forming a second portion of braking member 170 for braking the motor.

In the driving position of the transmission rotational member, the first projecting element 125 is in contact with the second projecting element 126 and a bottom face 144 of the ratchet cog 161, which is arranged to engage the braking surface 119A, is spaced from the braking surface. Thus, the rotational movement of the shaft in the first rotational direction is transferrable to rotational movement of the transmission rotational member in the first rotational direction.

In the braking position of the transmission rotational member, the first and second projecting elements 125, 126 are no longer in engagement with one another and the bottom face 144 of the ratchet cog is in engagement with the braking surface 119A. The threading is able to draw the transmission rotational member in tight butting engagement with the braking surface 119A which is at a fixed location.

Thus, the transmission rotational member 140 is movable by threadable interconnection with the shaft 120 in directions axially along the shaft between the driving member 124 to one side of the transmission rotational member and the second portion of the braking member 170 on the opposite side thereof.

Further to the forgoing components of the manual drive 100, the drive includes a motor brake release mechanism 180 that is arranged to disable the brake of the motor such that the motor is controllable by the manual drive. In the illustrated arrangement, the motor brake release mechanism is particularly but not exclusively designed for the motor used in the Vidir Pan Carousel.

The motor release mechanism 180 thus comprises an extendable arm 182 which is pivotally positionable between a disabling position, where the arm is in position so as to release the typically automatic brake of the motor, and an inactive position, where the arm is free of engagement with the motor brake. This pivotal positioning of the arm is effected by a rotatable control shaft 184 which is oriented transversely to the arm and connected thereto by a spacer plate 186 which locates a base of the arm outwardly of the control shaft. The control shaft 184 passes through the intermediate support plate 119 parallel to the shaft 120 but at a location clear of rotation of the transmission rotational member 140. A free end of the shaft is formed into a handle 185 curving outwardly of an axis defined by the control shaft, such that the human user may operate the arm by rotation of the handle about the axis of the control shaft.

The arm 182 is elongated transversely of the control shaft and is formed in two pieces. A first base piece 182A forming the base of the arm is attached to the spacer plate 186 by a fastener 187 passing through a slot in the first base piece. The arm may thus be adjusted angularly of the spacer plate so as to tune pivotal positioning of the arm when the control shaft 184 is rotated. The first base piece may also be adjustable in a direction in which the arm 182 is elongated such that a reach of the arm in its pivotal positioning may be tuned in this direction.

A second piece 182B of the arm is connected to the first base piece by a guide element 189 received in a second slot portion of the first base piece in transverse orientation thereto. The second piece may be adjustable (i) angularly of the first base piece about an axis defined by the guide element 189, and (ii) in the direction in which the arm is elongated.

Note that the second slot portion may be the same slot as that receiving the fastener 187 or may form a separate slot thereof.

The second piece 182B of the arm forms a plate with a free end 1821 of the second piece inclined upwardly out of a main portion of the arm. The main portion of the arm is formed by the first piece 182A and a portion of the second piece 182B which is located intermediately of the inclined end 1821 and the spacer plate 186.

When moved into the disabling position, the arm's inclined end 1821 acts to lift the motor brake out of its normal operating position, thereby disabling same.

Additionally, an upper arm 190 supporting a cam 192 at its free end is fixedly attached to the control shaft 184 at a location above the intermediate support plate 119 but below the handle 185 of the control shaft. This second arm 190 thus moves with rotation of the control shaft such that the cam 192 is moved into a position where it may contact the belt 150 as the rotation of the control shaft concurrently moves the brake disabling arm 182 into the disabling position. The cam 192 may be rotated to present one of a plurality of different surface for tensioning the belt 150 to a proper degree of tension.

The cam 192 is carried on a separate plate 190B which is connected by an upstanding pin to another plate 190A thereabove that is directly attached to the control shaft 184. These two plates 190A, 190B collectively form the second arm 190. The upstanding pin is thus seated in the plate 190A such that the plate 190B is rotatable about the axis of the control shaft 184 with movement of the plate 190A.

A rotatable guide 200, similar in shape to the handle 185, is supported on the intermediate support plate at a height inline with the belt-receiving portion of the transmission rotational member so that the guide 200 may be set in spaced relation from the belt 150 and may be usable to retain the belt in the belt-receiving portion.

Additionally, a guide element 210 is provided on the bottom support place 115B projecting inwardly towards the top support plate 115A such that the guide element may act as a stop to prevent collision of the arm 182 with the body 110 at the mounting portion.

Moreover, a cover 220 may be provided in a manner covering the transmission rotational member 140 and at least a portion of each of the belt 150 and the external rotational member 9 so as to protect the human user under operation of the manual drive 100.

We now turn to use of the manual drive 100 in cooperation with the motor 1.

With the manual drive 100 mounted to the frame 12 as described earlier but not yet positioned so as to override regular operation of the motor 1, the control shaft 184 is rotated by the human user so as to put the release arm 182 in the disabling position, thereby disabling the motor brake. As the release arm 182 is positioned in the disabling position, the upper arm 190 with the cam 192 thereon is moved into engagement with the belt 150 which is arranged in its loop over the transmission rotational member 140 and the external rotational member 9 of the motor, thereby sufficiently tensioning the belt so that the rotational movement of the transmission rotational member is transferable to the external rotational member.

Using the hand power drill (schematically shown) in the illustrated arrangement, the socket of the drill 300 is inserted onto the drive head 122 and the hand drill is set to operate in the same direction as the first rotational direction R1.

Driving the drive shaft 120 with the hand drill acts to shift the transmission rotational member 140 axially upwardly along the shaft towards the head 122 as the threading on the shaft in cooperation with the threading of the bore on the transmission rotational member forces the transmission rotational member to shift along the shaft in this direction. Such translational movement of the rotational member 140 along the shaft occurs until the free end 125B of the first projecting element engages the second projecting element 126, where the transmission rotational member is in the driving position. The rotational movement of the shaft 120 then effects the rotational movement of the transmission rotational member 140 in the first rotational direction R1.

The transmission rotational member in the driving position rotates at the same speed as the shaft 120. In the event that rotational movement of the drive shaft 120 is slowed down or that the transmission rotational member begins to rotate more quickly than the shaft at its controlled speed, for example in an over-speed condition due to imbalance in weights of the pans, the threading acts to shift the transmission rotational member axially along the shaft towards the braking surface 119A in order to slow down the transmission rotational member. If rotational movement of the shaft is halted, then the braking surface 119A acts to halt rotational movement of the transmission rotational member as it wants to continue shifting axially down the shaft but is stopped from doing so by the fixed location of the braking surface 119A. It will be appreciated that braking occurs by contact of metal surfaces—that is, metal-to-metal contact of the bottom face of the ratchet cog 161 which is metal and the braking surface of the intermediate support plate which is also metal in the illustrated arrangement.

In the event that the loading of the pans tends to rotate the main shaft of the motor in the second rotational direction R2, the ratchet 160 provides braking in the second rotational direction R2 so as to prevent rotational movement of the transmission rotational member in this direction.

Similarly, when the manual drive is actively coupled to the motor so as to be controlling same but is not being driven by the external agent, loading of the pans may tend to rotate the motor's main shaft in the first rotational direction but the manual drive is arranged to prevent this by engagement of the transmission rotational member with the braking surface 119A.

Additionally, it will be appreciated that in the illustrated arrangement the bore is threaded along its full axial length from a top face to a bottom face of the transmission rotational member. Also in the illustrated arrangement, the shaft is threaded for an entirety of that portion of its axial length which is located between the drive head 122 and a top of the shaft housing 130.

In another arrangement of the present invention, the shaft includes a first portion which is threaded and a second portion alongside the threaded first portion which is smooth, and the transmission rotational member has a bore receiving the shaft that has an inner surface which is at least partly threaded for threadably engaging the threaded first portion of the shaft. Thus, in this arrangement the transmission rotational member in the driving position may rotate about the smooth second portion while also overlapping the threaded first portion where partial threading of the bore remains threadably engaged with the shaft's first portion.

Thus, it will be appreciated that in some arrangements of the present invention the shaft may not be threaded for an entirety of that portion of its axial length which is between the drive head and the intermediate support plate.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A manual drive for a motor with an external rotational member coupled to a main shaft of the motor, the manual drive comprising:
   a body;
   a mounting arrangement defined by the body for mounting adjacent the motor in proximity to the external rotational member thereof;
   a shaft supported by the body for rotational movement;
   a transmission rotational member carried on the shaft for rotational movement about an axis defined by the shaft such that the transmission rotational member is arranged for operatively coupling to the external rotational member of the motor where the rotational movement of the transmission rotational member is operable to drive the motor via its external rotational member;

a driving member carried on the shaft at a location adjacent the transmission rotational member so as to be arranged for effecting the rotational movement of the transmission rotational member in a first rotational direction by rotational movement of the driving member in the first rotational direction;

a braking member arranged for braking rotational movement of the transmission rotational member;

the transmission rotational member being movable axially along the shaft between a driving position at one location along the shaft where the transmission rotational member is rotatable in cooperation with the driving member so as to drive the motor and a braking position at a different location along the shaft where the transmission rotational member is in engagement with the braking member for braking the motor.

2. The manual drive according to claim 1 wherein the driving member and the braking member are disposed on opposite sides of the transmission rotational member such that the transmission rotational member is movable axially along the shaft therebetween.

3. The manual drive according to claim 1 wherein the driving member comprises a first projecting element protruding radially of the shaft that is operable to engage a cooperative second projecting element on the transmission rotational member that is located at a radially spaced position of the shaft.

4. The manual drive according to claim 1 wherein the braking member comprises a surface carried by the body that is arranged to engage a face of the transmission rotational member facing axially in a direction along the shaft.

5. The manual drive according to claim 1 wherein the shaft is threaded and the transmission rotational member has a bore receiving the shaft that has an inner surface which is threaded for threadably engaging the threaded shaft.

6. The manual drive according to claim 5 wherein the shaft is threaded in a manner so as to be arranged to draw the transmission rotational member rotating in the first rotational direction along the shaft towards the braking member.

7. The manual drive according to claim 1 wherein the transmission rotational member in its rotational movement is rotatable relative to the shaft such that the transmission rotational member and the shaft are rotatable in the first rotational direction at the same or different speeds.

8. The manual drive according to claim 1 wherein the transmission rotational member includes a ratchet arranged to resist rotational movement of the transmission rotational member in an opposite second rotational direction.

9. The manual drive according to claim 1 wherein the transmission rotational member forms a pulley.

10. The manual drive according to claim 1 wherein a free end of the shaft is shaped for cooperation with a socket of a hand drill.

11. The manual drive according to claim 1 wherein there is provided a motor brake release mechanism that is arranged to disable a brake of the motor such that the motor is controllable by the manual drive.

12. The manual drive according to claim 11 wherein the motor brake release mechanism comprises an arm with an inclined end which is operable to engage the brake of the motor in a manner whereby the brake is disabled.

13. A manual drive for a motor with an external rotational member coupled to a main shaft of the motor, the manual drive comprising:

a body;

a mounting arrangement defined by the body for mounting adjacent the motor in proximity to the external rotational member thereof;

a shaft supported by the body for rotational movement;

a transmission rotational member carried on the shaft for rotational movement about an axis defined by the shaft such that the transmission rotational member is arranged for operatively coupling to the external rotational member of the motor where the rotational movement of the transmission rotational member is operable to drive the motor via its external rotational member;

a driving member carried on the shaft at a location adjacent the transmission rotational member so as to be arranged for effecting the rotational movement of the transmission rotational member in a first rotational direction by rotational movement of the driving member in the first rotational direction;

a braking member arranged for braking rotational movement of the transmission rotational member;

the transmission rotational member having a bore receiving the shaft that has an inner surface which is at least partly threaded;

the shaft having a threaded portion along at least a portion of its axial length that is threaded in a manner so as to be arranged to draw the transmission rotational member rotating in the first rotational direction along the shaft towards a first portion of the braking member by threadable engagement with the transmission rotational member such that the first portion of the braking member is operable for braking the transmission rotational member rotating in the first rotational direction;

and a second portion of the braking member arranged for braking the transmission rotational member rotating in an opposite second rotational direction.

14. The manual drive according to claim 13 wherein the first portion of the braking member comprises a surface carried by the body oriented in a radial plane of the shaft so as to be arranged to engage a face of the transmission rotational member facing axially along the shaft.

15. The manual drive according to claim 14 wherein the surface is arranged at a fixed location such that the transmission rotational member is movable axially along the shaft towards the fixed surface.

16. The manual drive according to claim 13 wherein the second portion of the braking member forms a ratchet arranged to resist rotational movement of the transmission rotational member in the second rotational direction.

17. The manual drive according to claim 16 wherein a part of the ratchet is unitary with the transmission rotational member so as to be rotatable therewith.

18. The manual drive according to claim 17 wherein the part of the ratchet unitary with the transmission rotational member includes a face facing axially along the shaft that is arranged to engage the first portion of the braking member when braking in the first rotational direction.

* * * * *